(No Model.) 2 Sheets—Sheet 1.

O. O. OVRE.
PLANTER.

No. 568,270. Patented Sept. 22, 1896.

WITNESSES:
William P. Goebel
J. Fred Acker

INVENTOR
O. O. Ovre.
BY
Munn
ATTORNEYS.

(No Model.) 2 Sheets—Sheet 2.

O. O. OVRE.
PLANTER.

No. 568,270. Patented Sept. 22, 1896.

WITNESSES:
William P. Gaebel.
J. Fred Acker

INVENTOR
O. O. Ovre

BY
ATTORNEYS.

UNITED STATES PATENT OFFICE.

OLE O. OVRE, OF GODAHL, MINNESOTA.

PLANTER.

SPECIFICATION forming part of Letters Patent No. 568,270, dated September 22, 1896.

Application filed April 3, 1896. Serial No. 586,085. (No model.)

*To all whom it may concern:*

Be it known that I, OLE O. OVRE, of Godahl, in the county of Watonwan and State of Minnesota, have invented a new and useful Improvement in Planters, of which the following is a full, clear, and exact description.

My invention relates to an improvement in planters, especially corn-planters; and the object of the invention is to construct a planter adapted for use in connection with a check-row wire, which planter may be expeditiously and conveniently attached to the riding-frame of an ordinary corn-plow.

A further object of the invention is to construct the planter in an exceedingly simple and durable manner and to provide for the regular and effective dropping of the seed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
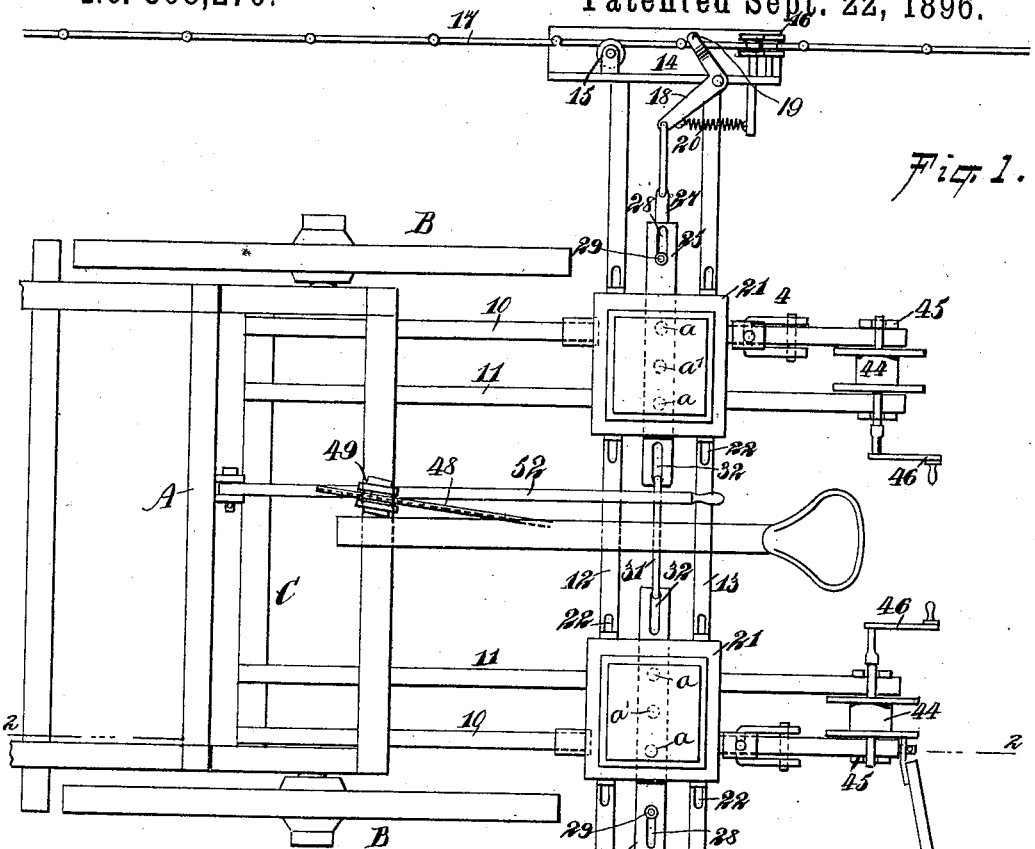
Figure 5:
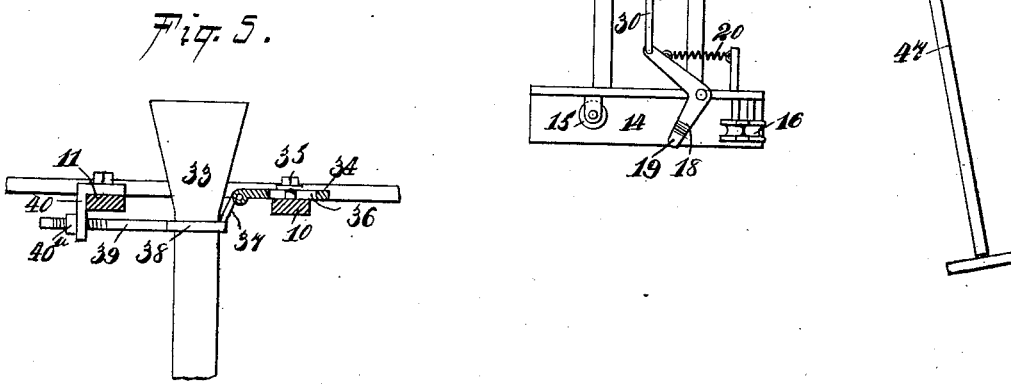
Figure 2:
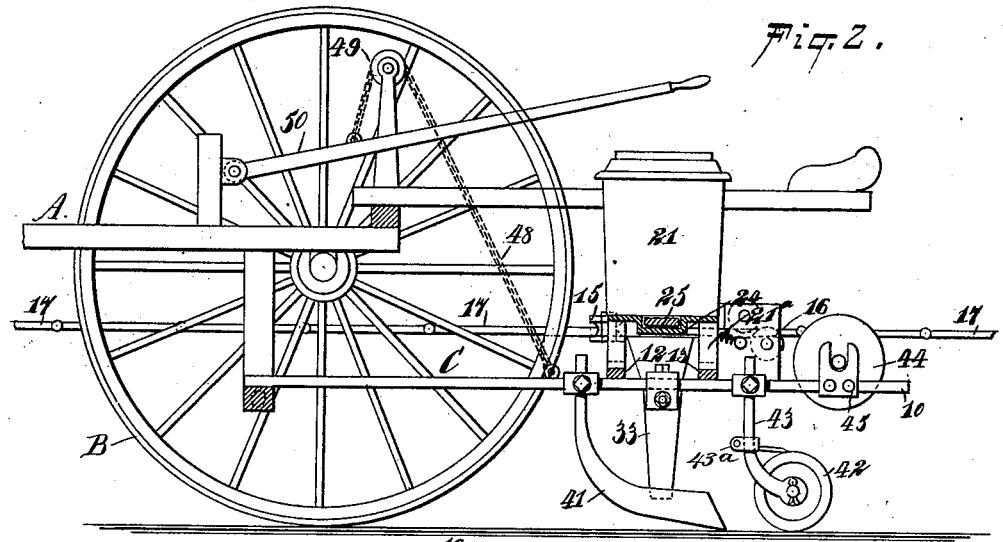
Figure 3:
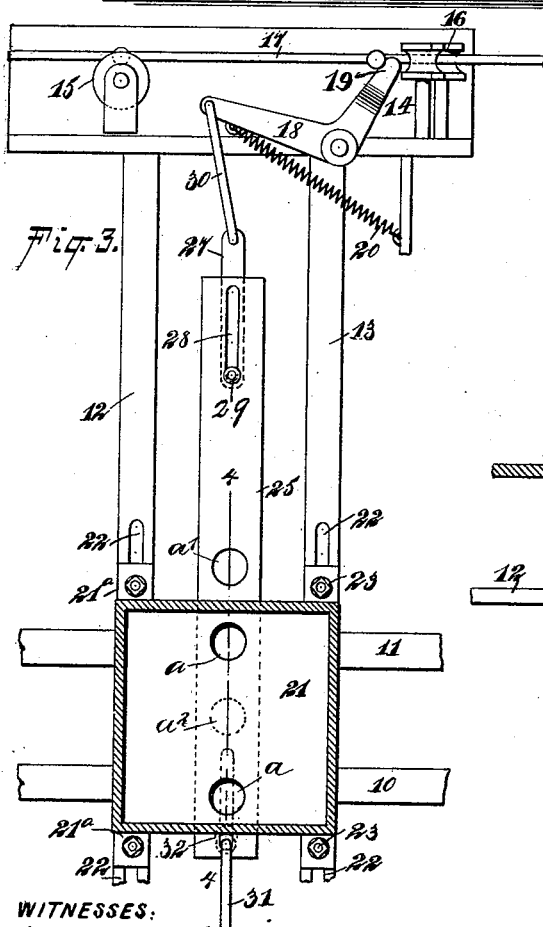
Figure 4:
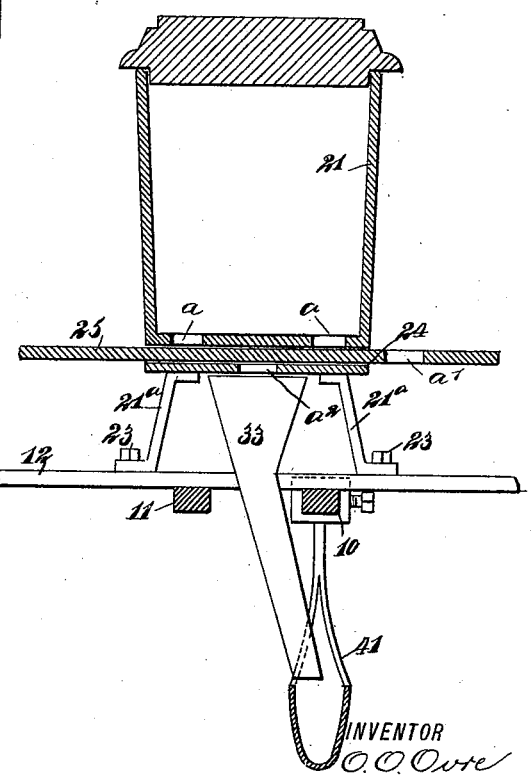

Figure 1 is a plan view of the planter attached to the riding-frame of a plow. Fig. 2 is a section through the said frame and planter, taken, practically, on the line 2 2 of Fig. 1. Fig. 3 is a horizontal section through a seedbox and a plan view of a support for the same, the seed-drop slide connected with the box, and the trip-lever which operates upon the check-row wire. Fig. 4 is a vertical section through the seedbox, its drop-slide and chute receiving the seed from the box, the conducting-chute being in side elevation; and Fig. 5 is a partial side elevation of the seed-conducting chute and a sectional view of its supports, illustrating the manner in which the chute may be adjusted proportionately to the adjustment of the seedbox when it is moved upon its support.

In carrying out the invention the plows are removed from the riding-frame A, used in connection with the ordinary corn-plow, the wheels B being retained on the frame, and the frame C of the planter is attached to the riding-frame A in any approved manner. The frame of the planter may be said to comprise outer side bars 10, extending rearwardly from the riding-frame, inner side bars 11, and cross-bars 12 and 13, which latter bars extend considerably beyond the outer side bars 10 and beyond the wheels of the riding-frame a sufficient distance to be brought beneath the check-row wire 17 when the said wire is stretched.

The cross-bars 12 and 13 support at each end a box or bracket 14, and a horizontal guide-pulley 15 and vertical guide-pulleys 16 extend over each box or bracket 14, one being adapted for engagement with the side of the check-row wire and the other with the top of the same.

A lever 18, preferably of angular construction, is pivoted at the junction of its members upon each bracket 14, and the outer member of each lever extends outwardly over the bracket with which it is connected and is bifurcated to receive between its members a check-row wire 17, the jaws thus formed in the levers being designated as 19, and a spring 20 is attached to the inner member of each drop-lever and to a fixed support on the frame or on the bracket, the spring serving to normally hold the gripping members of the drop-levers in position to take the check-row wire.

One or more, ordinarily two, seedboxes 21 are employed, and these boxes are preferably supported upon the cross-bars 12 and 13, through the medium of brackets 21ª, as shown in Fig. 4, and the said brackets are adjustable on the cross-bars 12 and 13, the said cross-bars being provided with longitudinal slots 22, through which bolts 23 are passed, attached to the brackets 21ª, so that the seedboxes may be adjusted to provide for the rows to be near together or far apart.

At the bottom of each seedbox a slideway 24 is formed, and the seed-drop slide 25 of any approved construction has movement beneath the seedboxes in each of the said slideways, each seedbox being provided with a suitable opening in its bottom for the discharge of seed, and the drop-slides having the ordinary receiving-openings made therein, adapted to register with the discharge-openings in the seedboxes; and a third opening is made in the slideways 24 of each box, with which an opening in a drop-slide when in discharging position will register, as shown in Fig. 4.

The openings in the seedboxes are designated as $a$, the openings in the seed-drop slides as $a'$, and the openings in the slideways as $a^2$. An arm 27 is projected from the outer end of each seed-drop slide, the said arm being provided with a bolt 29, which passes through a longitudinal opening 28 in the drop-slide, and each arm 27 is pivotally connected by a link 30 or its equivalent with the inner member of a lever 18. The inner ends of the two drop-slides are connected through the medium of a bar 31, which is passed at its ends downward through longitudinal openings 32, made in the drop-slides, and the extremities of the said bar are provided with suitable lock-nuts.

A seed-conducting chute 33 is supported beneath the discharge-opening $a^2$ in the guide or slide way of each seedbox, and the said conducting-chutes are adjustable, so that they may be moved proportionately to the adjustment of the seedbox from which they receive the seed. The adjustment of the seed-conducting chute is plainly shown in Fig. 5, in which it will be observed that a slotted plate 34 is located on the outer side bar 10, being held firmly thereto by an adjusting-screw 35, passed into the said bar through the opening in the plate, the opening being designated as 36. A downwardly-extending arm 37 is pivotally connected with the inner end of the plate 34, the said arm being attached to a collar 38, which surrounds the upper portion of the seed-conducting chute near its flaring upper extremity, and this collar is provided at its opposite side with a horizontal threaded arm 39, which is passed through a bracket 40, attached to the inner side bar 11, and the threaded end of the arm 39 has a nut $40^a$ placed thereon. Thus it will be observed that both of the seedboxes, together with their seed-conducting chutes, may be adjusted laterally whenever desired, and that the connection between the seed-drop slides and the drop-levers may be proportionately changed, as likewise the connection between the two drop-slides themselves.

The lower end of each seed-conducting chute 33 is made to enter a shoe 41, which shoe is trough-shaped, as shown in Fig. 4, and is provided with a rearwardly and downwardly curved body and a shank which is adjustably attached preferably to the outer side bar 10 of the planter-frame, and a covering-wheel 42 is located at the rear of each shoe 41, the hangers 43 of the said wheels being also adjustably attached to the outer side bars 10 of the planter-frame and provided with a scraper $43^a$ to remove clinging mold.

A reel 44 is located at the rear extremity of each pair of longitudinal or side beams 10 and 11 of the planter-frame, the said reels being adapted to contain the check-row wire when not in use, and these reels are mounted to revolve in suitable bearings 45, attached to the aforesaid longitudinal bars, and crank arms or handles 46 are attached to the said reels in order that they may be properly rotated.

A marker 47 is removably connected with the rear extremity of the outer side or longitudinal beam 10, as illustrated in Fig. 1, and the planter-frame may be raised or lowered by means of a chain 48, suitably attached to it and passed over a pulley 49, located on the wheel-frame, the said chain being attached to a lever 50, carried by the said wheel-frame, and the connection between the planter and the wheel-frame is such as to admit of vertical movement of the former.

The operation of the planter is practically the same as that of any planter operated from a check-row wire.

Having thus described my invention, I claim as new and desire to secure by Letters Patent—

1. In a planter, a support, a seedbox laterally adjustable upon the said support, a drop-slide for the box, a lever having an adjustable connection with the said drop-slide and arranged to be operated by a check-row wire, a seed-conducting chute adjustably supported beneath the seed-drop slide, and an adjustable shoe having its body inclined and trough-shaped, the said body portion of the shoe receiving the seed, as and for the purpose specified.

2. In a planter, a support, a seedbox laterally adjustable upon the said support, a drop-slide for the box, a lever having an adjustable connection with the said drop-slide and arranged to be operated by the check-row wire, a seed-conducting chute adjustably supported beneath the seed-drop slide, and an adjustable shoe downwardly and rearwardly curved, the said shoe being trough-shaped and open at its rear end, the trough of the shoe receiving the lower end of the seed-conducting chute, as and for the purpose specified.

3. In a planter, a support, a seedbox laterally adjustable upon the said support, a drop-slide for the box, a lever having an adjustable connection with the said drop-slide and arranged to be operated by the check-row wire, a seed-conducting chute adjustably supported beneath the seed-drop slide, an adjustable shoe downwardly and rearwardly curved, the said shoe being trough-shaped and open at its rear end, the trough of the shoe receiving the lower end of the seed-conducting chute, and an adjustable covering-wheel located in alinement with and at the rear of the discharge end of the said shoe, as and for the purpose specified.

4. In a planter, the combination, with a frame and means for supporting the same, and seedboxes laterally adjustable upon the said frame, of a drop-slide for each seedbox, an adjustable connection between the two drop-slides, a lever located at each outer side portion of the frame, an adjustable connection between the drop-slides and the said levers, seed-conveying chutes adjustably supported beneath the seed-drop slides, adjustable shoes receiving the lower ends of the seed-conducting chutes, and adjustable covering-wheels located at the rear of the said shoes, as and for the purpose specified.

5. In a planter, the combination with a supporting-frame, of seedboxes on the frame, drop-slides for the boxes, pivoted and spring-actuated angle-levers on the outer ends of the frame, said levers having one member forked to receive the check-row wire, and an adjustable connection between one member of the said levers and the drop-slides, substantially as described.

6. In a planter, the combination with a supporting-frame, of seedboxes on the frame, drop-slides for the boxes, said slides being connected together, pivoted and spring-actuated angle-levers on the outer ends of the frame, said levers having one member forked to receive the check-row wire, an arm adjustably secured to one end of each drop-slide, and links connecting the said arms with the angle-levers, substantially as described.

7. In a planter, the combination with a supporting-frame, a hopper thereon, a conducting-chute below the hopper, of a collar through which the chute projects, said collar being provided with a threaded arm, an adjustable plate to which the collar is pivoted, a bracket through which the arm projects, and a nut on the arm, substantially as described.

8. A planter attachment for plows, comprising a frame having laterally-projecting portions, said portions being provided with brackets carrying guide-pulleys, seedboxes adjustably mounted on the frame, drop-slides for the seedboxes, pivoted and spring-actuated angle-levers on the said brackets, links connecting the angle-levers with the drop-slides, conducting-spouts adjustably secured to the frame, and an adjustable shoe into which the spout extends, substantially as described.

9. A planter attachment for wheeled plows, comprising a frame formed of longitudinal bars and cross-bars, the cross-bars projecting beyond the longitudinal bars and provided at their ends with brackets carrying guide-pulleys, seedboxes adjustably secured to the cross-bars, drop-slides for said boxes, said slides being connected, pivoted and spring-actuated angle-levers on the brackets, links connecting the levers with the drop-slides, conducting-chutes adjustably secured to the longitudinal bars, shoes adjustable to the longitudinal bars and into which the chutes extend, and covering-wheels secured to the longitudinal bars in rear of the chutes, substantially as described.

OLE O. OVRE.

Witnesses:
  SWEN. O. OVRE,
  THOMAS H. BLOCKSTAG.